United States Patent

McDonald

[11] Patent Number: 5,765,195
[45] Date of Patent: Jun. 9, 1998

[54] METHOD FOR DISTRIBUTING INTERPROCESSOR INTERRUPT REQUESTS VIA CACHE MEMORY COHERENCY MECHANISMS

[75] Inventor: Edward A. McDonald, Baton Rouge, La.

[73] Assignee: NCR Corporation, Dayton, Ohio

[21] Appl. No.: 569,542

[22] Filed: Dec. 8, 1995

[51] Int. Cl.⁶ .................................................. G06F 9/30
[52] U.S. Cl. .......................... 711/141; 711/142; 711/143; 711/144; 711/145
[58] Field of Search ...................... 395/469, 403, 395/488, 737, 739, 738, 457, 470, 471, 472, 473, 481, 485; 711/141, 142, 143, 144, 145

[56] References Cited

U.S. PATENT DOCUMENTS

| | | | |
|---|---|---|---|
| 4,313,158 | 1/1982 | Porter et al. | 395/467 |
| 4,426,681 | 1/1984 | Bacot et al. | 395/457 |
| 4,783,736 | 11/1988 | Ziegler et al. | 395/457 |
| 4,839,800 | 6/1989 | Barlow et al. | 395/737 |
| 4,907,149 | 3/1990 | Gula et al. | 395/737 |
| 4,912,632 | 3/1990 | Gach et al. | 395/848 |
| 5,067,071 | 11/1991 | Schanin et al. | 395/293 |
| 5,119,485 | 6/1992 | Ledbetter, Jr. et al. | 395/473 |
| 5,269,005 | 12/1993 | Heil et al. | 395/308 |
| 5,282,272 | 1/1994 | Guy et al. | 395/200.06 |
| 5,283,904 | 2/1994 | Carson et al. | 395/739 |
| 5,353,415 | 10/1994 | Wolford et al. | 395/306 |

*Primary Examiner*—Eddie P. Chan
*Assistant Examiner*—Than V. Nguyen
*Attorney, Agent, or Firm*—James M. Stover

[57] ABSTRACT

A mechanism for distributing interrupts to processors within a multi-processing system including a cache memory corresponding to each processor, a main memory, a bus structure connecting the processors and their associated cache memories with the main memory, and a cache coherency mechanism to maintain data consistency between the cache memories and the main memory. An address within the main memory is assigned to each processor within the system, the assigned address being associated with an interrupt for the processor to which it is assigned. For each processor, a copy of the contents of its assigned address is thereafter read into its corresponding cache memory. Thereafter when a cache coherency operation to update the contents or status of the cache memory address occurs, a comparison is made between the cache memory address presented to the cache memory through the system bus structure and a stored interrupt base address. An interrupt signal for the processor is generated when the comparison determines a match between the cache memory address presented to the cache memory through the system bus structure and a stored interrupt base address.

7 Claims, 5 Drawing Sheets

METHOD FOR DISTRIBUTING INTERPROCESSOR INTERRUPT REQUESTS VIA CACHE MEMORY COHERENCY MECHANISMS

The present invention relates to multi-processor computer systems and, more particularly, to a method for managing interrupt requests in a multi-processor environment.

BACKGROUND OF THE INVENTION

AT&T Global Information Solutions Co. has developed an improved scaleable computer system architecture providing the flexibility to scale-up incrementally, adding processing power beyond that allowed in prior scaleable system architectures while still offering backward compatibility to prior system solutions. One implementation of this architecture employing dual split-transaction memory or system busses 112 and 114, two dual-ported system memory modules 116 and 118 connected between the two system busses, two processor boards 120 and 122 connected to system bus 112, and two processor boards 124 and 126 connected to system bus 114 is shown in FIG. 1.

In the architecture shown in FIG. 1, each one of processor boards 120, 122., 124 and 126 contains four processors 212, 214, 216 and 218 as shown in FIG. 2. Each one of processors 212, 214, 216 and 218 includes a second level cache, identified by reference numerals 222, 224, 226 and 228, respectively. The processors and their associated second level cache memories are connected together through a disconnect or split-transaction bus 230, used exclusively for inter-processor communication. This bus is also referred to herein as a nodal-bus, or n-bus. An n-bus to system bus interface 240 interfaces n-bus 230 with one of system buses 112 or 114.

A major consideration in the design of scaleable multi-processor systems, such as the system described above and shown in FIGS. 1 and 2, is the management of interrupts. Interrupts are utilized by external devices to suspend processor operations and force the processor to execute an interrupt routine which will service the interrupting device. Most processors include one or more interrupt input pins which are utilized by the external devices to send their interrupt signals. FIG. 3 provides a simplified block diagram illustration of prior art logic for managing up to eight interrupting devices to an Intel processor 301 using a programmable interrupt controller (PIC) 303. The programmable interrupt controller 303 can interfaces with up to eight interrupt devices through inputs IREQ0 through IREQ7. PIC 303 handles interrupt priority resolution, allows masking of interrupt signals, and tracks which interrupt requests are pending and which are currently being serviced. Multiple PICs may be cascaded to increase the number of managed interrupt devices.

All newer Intel processors utilize a vectored interrupt structure. PIC 303, in response to the receipt of an interrupt signal from an external device, provides an eight bit identifier referred to as a "vector number" on the data bus DB. Processor 301 reads the vector number from data bus DB and converts the vector number into a "vector address", normally by multiplying the vector by four. This vector address points to an address in a special area of low memory known as a "vector table". A "vector" obtained from the vector table is used to fetch the first instruction of an interrupt handling routine (IHR) for servicing the interrupt request.

The interrupt handling process briefly described above with reference to FIG. 3 becomes more complicated in a multi-processor system, and increasingly complex as the number of processors and interrupt devices within the system is increased. An improved method for managing cross-processor interrupt requests in a multi-processor environment is desired.

OBJECTS OF THE INVENTION

It is therefore an object of the present invention to provide a new and useful method for managing interrupt requests in a multi-processor environment.

It is another object of the present invention to provide such a method which utilizes cache coherency mechanisms within a multi-processor system for distributing interrupt requests.

It is yet another object of the present invention to provide a new and useful method and apparatus for decoding address signals transmitted through cache coherency operations within a multi-processor system to generate processor interrupt signals.

It is still a further object of the present invention to provide a new and useful method for distributing interrupts throughout a multi-processing system, wherein interprocessor interrupts are distributed by relying on processing system cache coherency mechanisms, allowing, for symmetric and scaleable distribution of interrupts without requiring a separate interrupt distribution mechanism, such as a separate interrupt bus.

SUMMARY OF THE INVENTION

There is provided, in accordance with the present invention, a method for distributing interrupts to a processor within a multi-processing system including a cache memory corresponding to the processor, a main memory, a bus structure connecting the processor and its associated cache memory with the main memory, and a cache coherency mechanism to maintain data consistency between the cache memory and the main memory. The method includes the steps of assigning to the processor an address within the main memory, the assigned address being associated with an interrupt for the processor; and reading a copy of the contents of the assigned address into a cache memory address within the cache memory. Thereafter when a cache coherency operation to update the contents or status of the cache memory address occurs, a comparison is made between the cache memory address presented to the cache memory through the system bus structure and a stored interrupt base address. An interrupt signal for the processor is generated when the comparison determines a match between the cache memory address presented to the cache memory through the system bus structure and a stored interrupt base address.

In the described embodiment, interrupts are distributed to multiple processors, each having its own cache memory, within the system as described above, a separate main memory address being assigned to each processor for the distribution of interrupts. The described embodiment further provides for the distribution of multiple interrupts to each processor in the system by assigning a narrow range of addresses to each processor. The addresses within this range each contain a first portion which is common to each address and identifies the address as corresponding to a particular processor within the system, and a second portion which is decoded to determine one of a plurality of interrupts for the processor.

The above and other objects, features, and advantages of the present invention will become apparent from the following description and the attached drawings.

DETAILED DESCRIPTION OF THE PREFERRED EMBODIMENT

Figure 1:
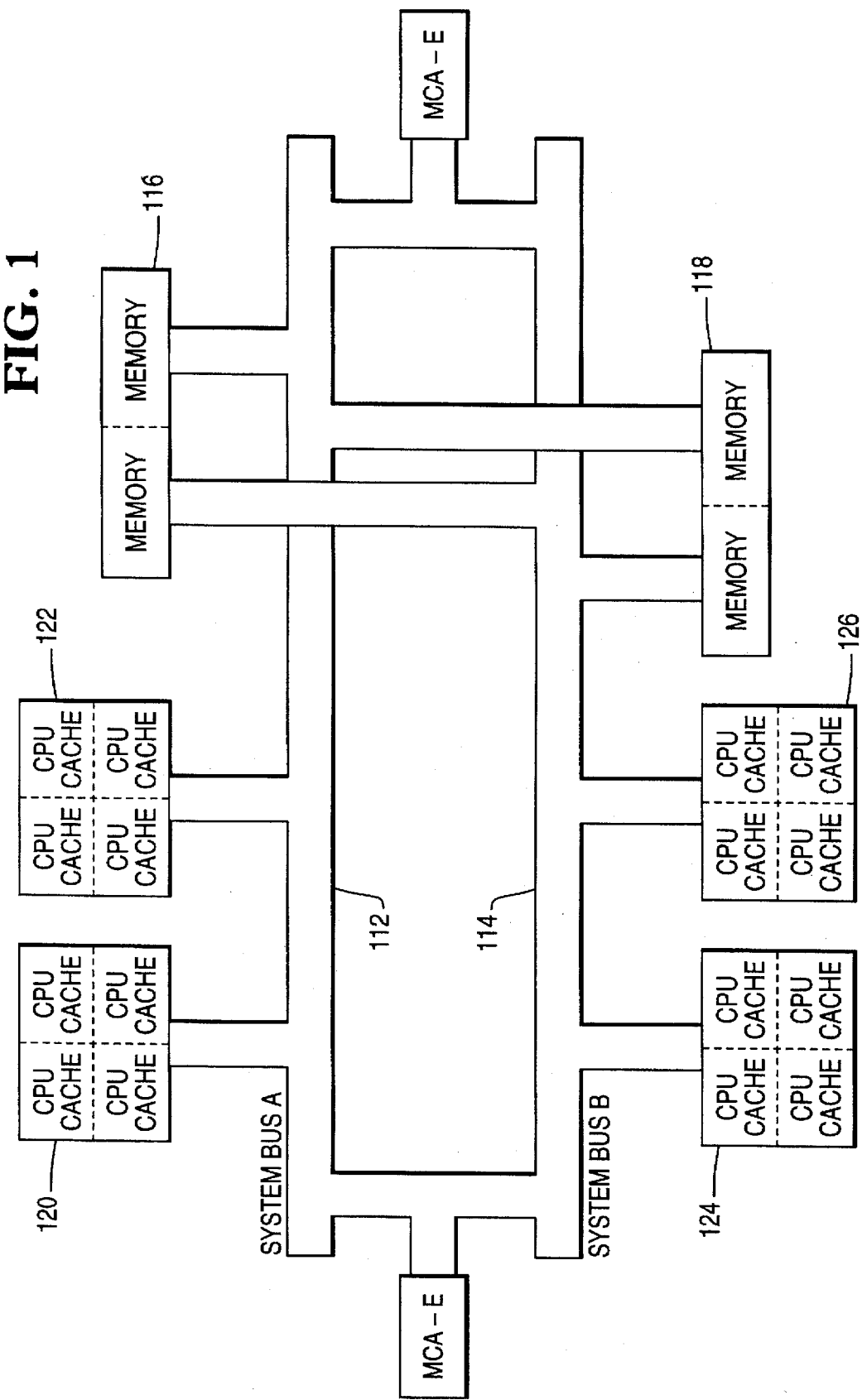
FIG. 1 is a block diagram representation of a scaleable system architecture for a computer system.

Referring now to FIG. 1, there is seen a multi-processor system architecture employing dual split-transaction memory or system busses 112 and 114, two dual-ported system memory modules 116 and 118 connected between the two system busses, two processor boards 120 and 122 connected to system bus 112, and two processor boards 124 and 126 connected to system bus 114. In the architecture shown in FIG. 1, each one of processor boards 120, 122, 124 and 126, referred to herein as Quad boards, contains four processors 212, 214, 216 and 218 as shown in FIG. 2.

In the structure shown, processors 212, 214, 216 and 218 contained on each processor board 120, 122, 124 and 126 are Intel Pentium ™ processors. A combination of innovations allows these processors to remain fully utilized and productive. Since communication between processors 212, 214, 216 and 218 is critical for data integrity, the processors on each processor board 120, 122, 124 and 126 are interconnected through a data pathway called a disconnect bus 230, used exclusively for inter-processor communication. This bus is also called a nodal-bus, or n-bus. From the perspective of the system busses 112 and 114, each Quad board resembles a single processor attached to one of the dual system buses.

Figure 2:
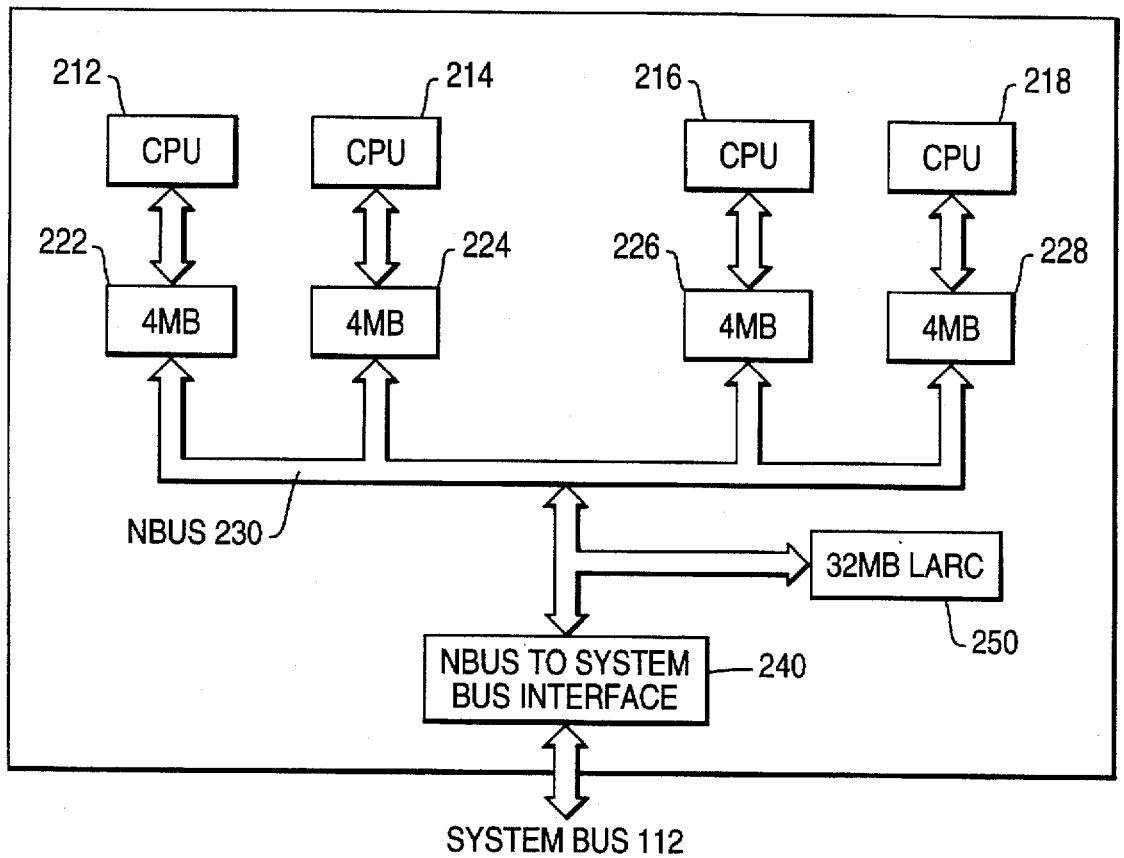
FIG. 2 is a block diagram representation of the architecture included in one of the processor boards shown in FIG. 1.

In addition to an internal first level cache included within each Pentium™ processor, an external second level cache memory, shown in FIG. 2 as having a size of 4 megabytes and identified by reference numerals 222, 224, 226 and 228, is associated with each of processors 212, 214, 216 and 218, respectively.

The advantages offered by the use of cache memories to improve system speed, allowing processors to operate effectively at the faster speed of the cache memory rather than at the slower speed of a conventional DRAM main memory, are well known. A cache memory provides information to its associated processor faster than main memory, thus improving read cycles. Write cycles are also improved as a cache memory receives information from its associated processor at a fast rate, allowing the processor to continue processing while the cache independently processes the write to main memory as needed. The use of cache memories, such as second level cache memories 222, 224, 226 and 228, within a multi-processor system, however, provides additional advantages. System performance is improved through more efficient utilization of the memory or system buses. Traffic on the memory bus is reduced. Each data read and write operation need not involve main memory, rather data can be exchanged between the cache and main memory when convenient through the execution of burst cycles. The use of a line buffer to update the cache memory and the use of dual system busses further improves bus utilization.

To track the data moving between the processors and memory modules 116 and 118, the system busses 112 and 114 utilize a directory-based cache coherency scheme. A directory-base cache coherency scheme is a method of keeping track of data movements between the processors and memory. With this approach to data coherency, a memory status table identifies which processors have which lines of memory in their associated cache memories. When a processor requests data, the status table identifies the location within main memory or processor cache where the most current copy of the data resides. The advantage of this method is that no additional work must be performed until a processor needs data that resides in a cache that cannot be accessed through snooping. Directory-based cache coherency is most effective with a large number of tightly-coupled processors on a system bus.

Within each Quad board, the four processors use a bus snooping protocol on the n-bus. Bus snooping is a method of keeping track of data movements between processors and memory. There are performance advantages to this system with a small number of tightly-coupled processors. If a processor needs data that is available in the cache of another processor on the same Quad board, the data can be shared by both processors. Otherwise, the data must be retrieved from main memory, a more time consuming operation which requires system bus traffic. This method enhances system performance by r educing system bus contention.

Although bus snooping is fine on the n-bus, it can have negative consequences for system complexity and system performance as the system is scaled to include a larger number of tightly-coupled processors on a common bus.

To store heavily used sections of system memory such as the operating system kernel and database executable files, a Limited Address Range Cache (LARC) 250 is sharable among all four processors on a Quad board. The operating system can command the LARC to map any read from designated address ranges in main system memories 116 and 118. These addresses, once fetched, are cached into LARC memory 250 and most likely do not ever need to be re-fetched from memories 116 and 118. This architecture reduces traffic on the system bus and effectively increases the system bus bandwidth.

In any system employing a cache memory, and particularly a system employing multiple cache memories and multiple levels of cache memories, data from a given memory location can reside simultaneously in main memory and in one or more cache memories. However, the data in main memory and in cache memory may not always be the same. This may occur when a microprocessor updates the data contained in its associated cache memory without updating the main memory and other cache memories, or when another bus master changes data in main memory without updating its copy in the microprocessor cache memories.

Mechanisms for maintaining data consistency between main memory and cache memories, i.e., cache coherency, are well known in the art. Although software techniques may be utilized to maintain cache coherency, solutions implemented in hardware provide a more efficient approach to maintaining cache coherency. One well known solution to the data coherency problem is the Modified-Exclusive-Shared-Invalid (MESI) cache coherency protocol. Typical implementation of the MESI hardware cache coherency protocol requires the utilization of cache controllers having the ability to:

1. use the same line size for all caches on the memory bus;
2. observe all activity on the memory bus;
3. maintain state information for every line of cache memory; and
4. take appropriate action to maintain data consistency within the cache memories and main memory.

The four states represented by MESI define whether a line is valid, if it is available in other caches, and if it has been modified. Each line of data in a cache includes an associated field which indicates whether the line of data is MODIFIED, EXCLUSIVE, SHARED, or INVALID. The four states are defined as follows for any cache:

MODIFIED—This state indicates a line of data which is exclusively available in only this cache, and is modified.

Modified data has been acted upon by a processor. A Modified line can be updated locally in the cache without acquiring the shared memory bus.

EXCLUSIVE—This state indicates a line of data which is exclusively available in only this cache, and that this line is not Modified (main memory also has a valid copy). Exclusive data can not be used by any other processor until it is acted upon in some manner. Writing to an Exclusive line causes it to change to the Modified state and can be done without informing other caches, so no memory bus activity is generated. The Exclusive state is of limited use in a copyback cache that allocates on "writes". The Exclusive state is generally bypassed because the entry goes directly to the Modified state.

SHARED—This state indicates a line of data which is potentially shared with other caches (the same line may exist in one or more caches). Shared data may be shared among multiple processors and stored in multiple caches. A Shared line can be read by the CPU without a main memory access. Writing to a Shared line causes a write-through cycle.

INVALID—This state indicates a line of data is not available in the cache. Invalid data in a particular cache is not to be used for future processing, except diagnostic or similar uses. A read to this line will be a "miss" (not available). A write to this line will cause a write-through cycle to the memory bus.

In accordance with the MESI protocol, when a processor owns a line of memory, whether modified or exclusive, any writes to the owned line of memory within main memory will result in an immediate update of the same data contained within the processor's cache memory.

The present invention utilizes a computer system's cache memory structure and the mechanisms employed within the system for maintaining cache coherency, as described above, to distribute cross-processor interrupts. One or more cache lines of memory are allocated to each processor within the system for this process. The cache lines are monitored and an interrupt and its associated interrupt vector are generated when another bus master executes a write to the monitored cache lines. The bus master may be another processor or interrupt device within the multiple-processor system.

During initialization of system hardware, each processor is programmed to know which memory addresses correspond to the processor's interrupts and the interrupt levels. In addition, each processor is instructed to read its associated memory addresses in order to copy the memory lines into the processor's local cache memory. Thereafter, a write to a memory address associated with a particular processor's interrupt will result in a cache coherency operation updating the copy contained in the processor's local cache memory.

Figure 4:
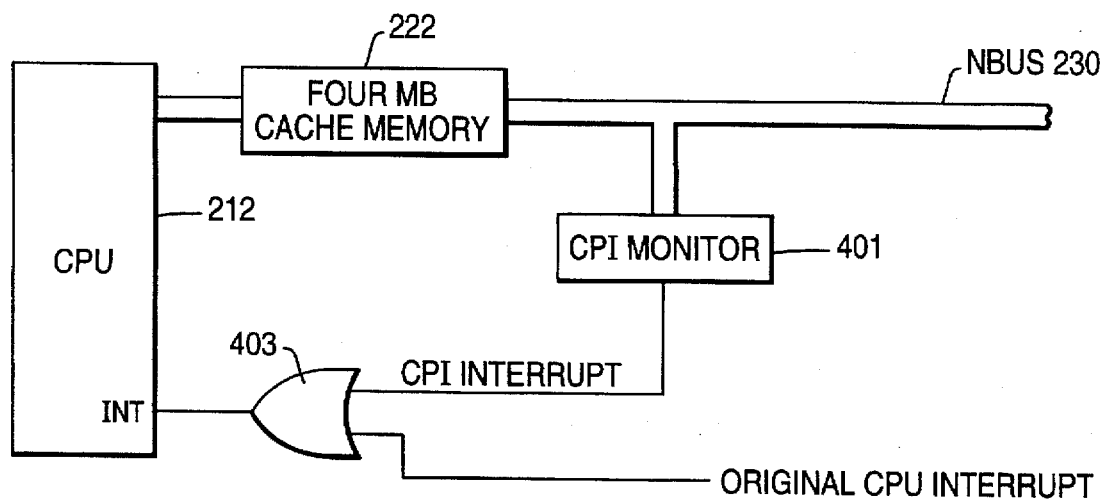
FIG. 4 is a high level block diagram illustration of logic for detecting a cache coherency operation and generating an interrupt vector therefrom in accordance with the present invention.
Figure 3:
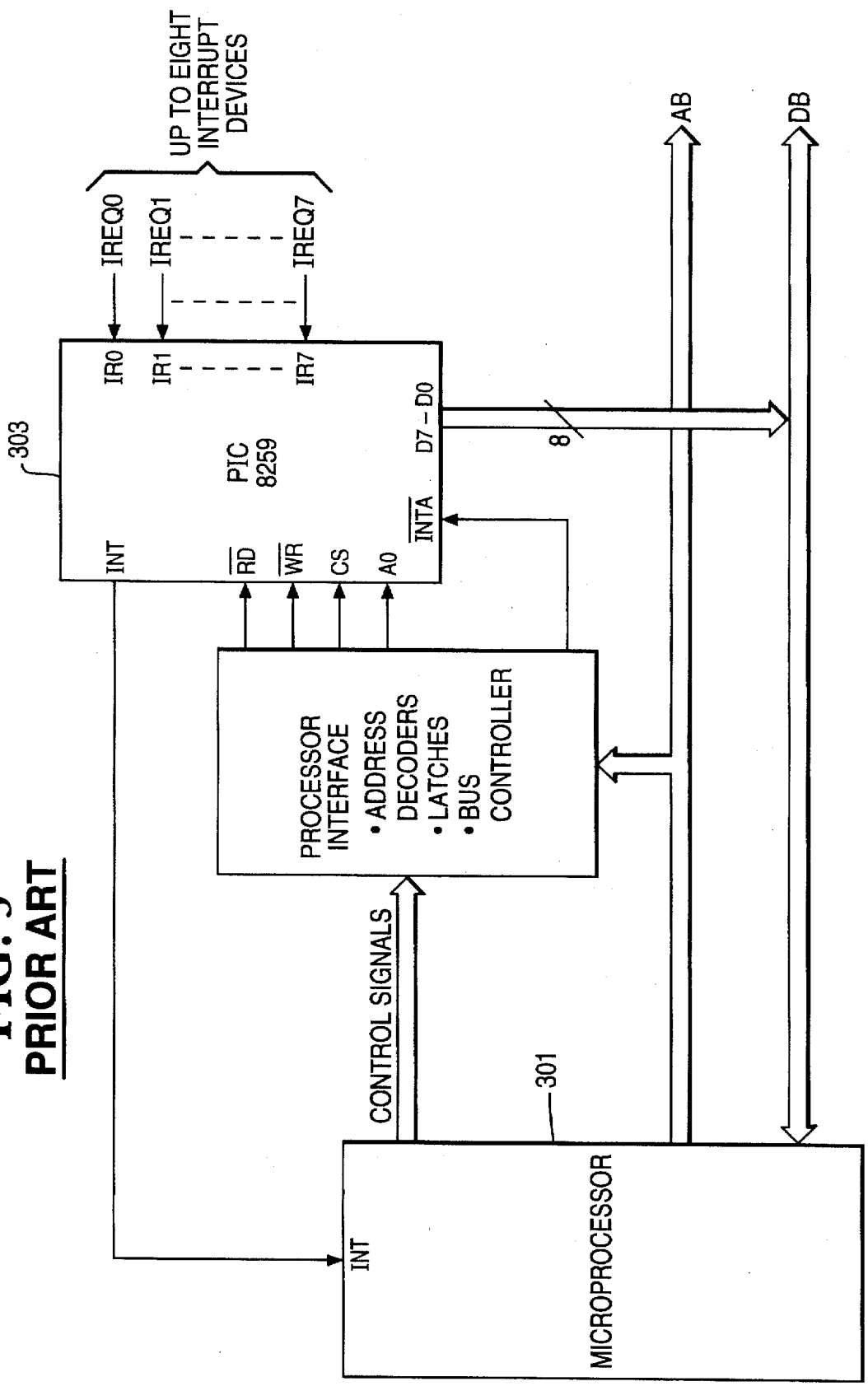
FIG. 3 is a simplified block diagram illustration of prior art logic for interfacing up to eight interrupting devices to a processor using a programmable interrupt controller (PIC).
Figure 5:
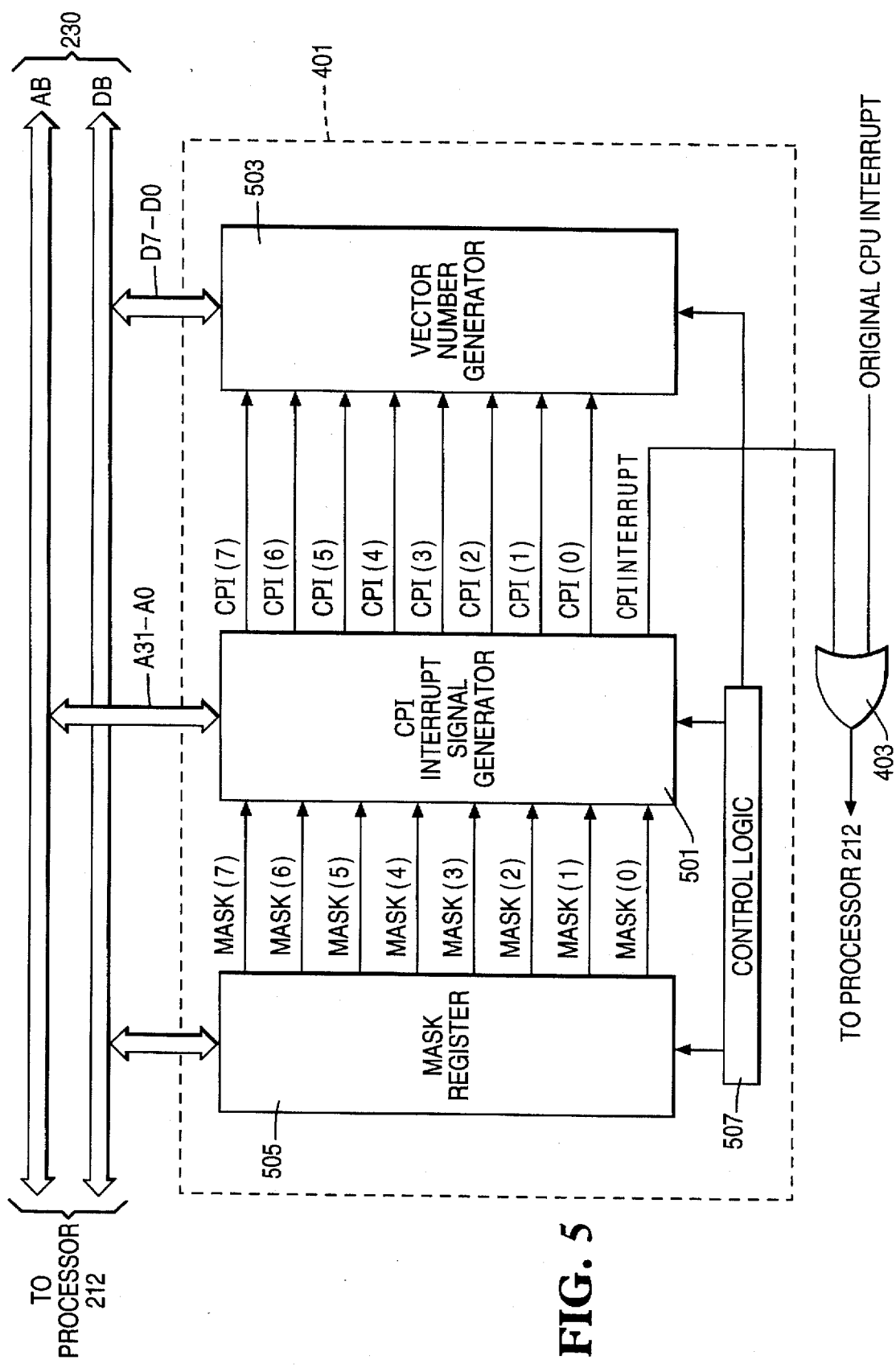
FIG. 5 is a simplified block diagram of logic contained within the interprocessor interrupt monitor (CPI) 401 shown in FIG. 4 for detecting a cache coherency operation and generating an interrupt vector therefrom in accordance with the present invention.
Figure 6:
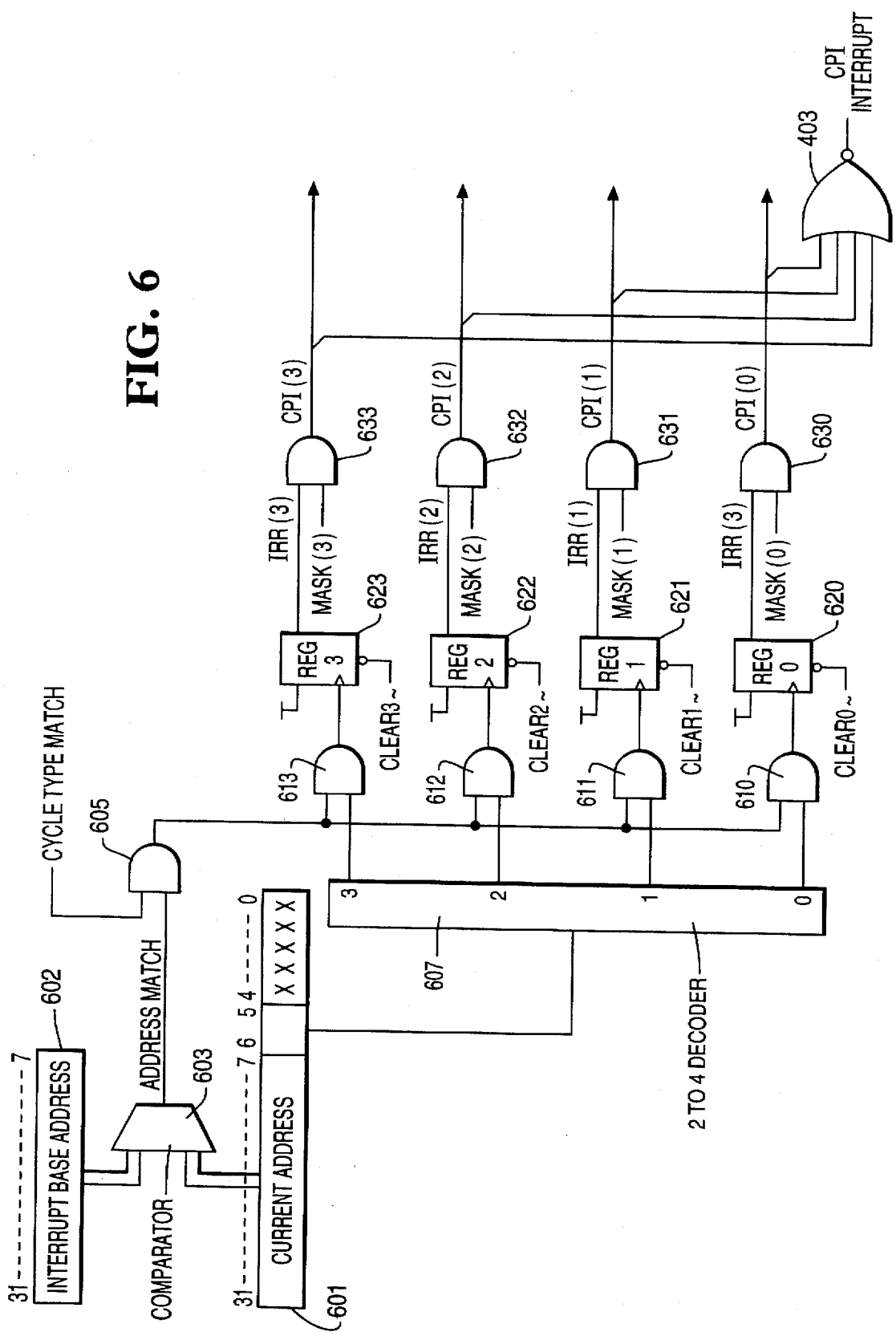
FIG. 6 is a simplified block diagram of logic contained within the CPI interrupt signal generator 501 shown in FIG. 5 for generating an interrupt signal in accordance with the present invention.

Logic for monitoring the cache coherency mechanism to detect interrupt requests is shown in FIGS. 4, 5 and 6. FIG. 4 provides a high level block diagram illustration of logic for detecting a cache coherency operation and generating an interrupt vector therefrom. The logic, shown as CPI monitor 403, monitors the processor's bus interface to detect writes or cache coherency cycles to cache line addresses associated with processor 401 interrupt levels and generates a CPI_INTERRUPT signal if such a cycle is detected. This CPI_INTERRUPT is provided through an OR gate 403 to the processor interrupt input INT. The standard processor interrupt signal is also provided through OR gate 403 to the processor interrupt input INT. Each one of processor boards 120, 122, 124, and 126 includes this logic.

The CPI monitor 401 performs the following functions:

1. Monitors the processor bus interface to detect write operations or proper cache coherency cycles directed to cache line addresses associated with the processor's interprocessor interrupt levels;
2. Generates a CPI_INTERRUPT signal if a write operation or cache coherency cycle directed to cache line addresses associated with the processor's interprocessor interrupt levels is detected;
3. Responds to read and write requests to CPI control registers; and
4. Intercepts interrupt acknowledge signals following assertion of the CPI_INTERRUPT signal and returns appropriate interrupt vector to the processor.

The logic internal to CPI monitor 403 for detecting a cache coherency operation and generating an interrupt signal and interrupt vector therefrom is shown in the simplified block diagram of FIG. 5. Node bus 230 is shown as including both a data bus DB and address bus AB. CPI monitor 401 is seen to include logic for generating a CPI interrupt signal 501, logic for generating an interrupt vector number 503, and a mask register 505. Control logic 507 is provided to control operation of the logic blocks within CPI monitor 401.

CPI interrupt signal generator 501 is connected to monitor addresses placed on node bus 230, which are compared to an interrupt base address stored within a register internal to CPI monitor 501 to generate the CPI_INTERRUPT signal. Logic for generating a CPI_INTERRUPT signal is shown in the simplified block diagram of FIG. 6.

The logic of FIG. 6 includes a register for storing an interrupt base address 601. In the circuitry shown, interrupt base address consists of bits 7 through 31 of a 32-bit address. A comparator 603 is connected to receive and compare the interrupt base address 601 with bits 7 through 31 of the 32-bit current address 602 received from the node bus. The output of comparator 603, labeled ADDRESS MATCH, is provided through a first AND gate 605 to the inputs of four AND gates identified by reference numerals 610 through 613. AND gate 605 either allows or inhibits the transmission of the ADDRESS MATCH signal to gates 610 through 613, depending upon the state of a control signal CYCLE TYPE MATCH, received by gate 605.

AND gates 610 through 613 are also each connected to receive one of four outputs from a 2 to 4 decoder 607.

Multiple interrupt levels are provided by decoding bits 5 and 6 of the current address 601 and gating the decoder outputs with the ADDRESS MATCH signal. The outputs of gates 610 through 613 are latched within registers 620 through 623, respectively. These four signals, labeled IRR(0) through IRR(3) are thereafter gated together with four mask signals MASK(G) through MASK(3) by operation of AND gates 630 through 633, to generate four CPI interrupt signals CPI(0) through CPI(3). These four signals CPI(0) through CPI(3) combined form the CPI INTERRUPT signal.

The logic shown in FIG. 6, provides for four interrupt levels by decoding bits 5 and 6 of the current address and generates four interrupt signals, CPI(0) through CPI(3). Additional structure can readily be added to the logic by decoding more address bits; for example address bits 7, 6, and 5, to provide for up to eight interrupt levels and to generate the eight interrupt signals CPI(0) through CPI(7) shown in FIG. 5. Masking signals MASK(0) through MASK (7) are received from mask register 505.

In addition to being provided to OR gate 403, signals CPI(0) through CPI(7), are also provided to vector number generator logic 503, as shown in FIG. 5. Vector number generator 503 provides an eight bit vector number to node bus 230 in response to receipt of the interrupt signals from CPI interrupt signal generator 501. The logic included within vector number generator 503 is similar to the logic included within a conventional programmable interrupt controller for generating vector numbers from external interrupt signals. Vector number generator 503 may also include priority resolver logic for determining the highest priority interrupt when multiple interrupt signals are received by CPI monitor 401.

In operation, processor 212 responds to the receipt of the CPI_INTERRUPT signal from CPI monitor 401 in the same fashion as it would respond to a standard interrupt signal generated by a programmable interrupt controller, reading the vector number provided to the node bus by either the vector number generator 503 or the normal vector number generator (for original CPU interrupt) and converting the vector number into a vector address which points to an address in the vector table. A vector obtained from the vector table is used to fetch the first instruction of an interrupt handling routine (IHR) for servicing the interrupt request. The IHR must reenable receiving its interrupt vector number by reading the associated cache line each time the IHR is invoked. This is required in order to ensure that the CPI monitor logic will see future writes or cache coherency cycles resulting from future writes by other processors.

It can thus be seen that there has been provided by the present invention a new and useful method for managing interrupt requests in a multi-processor environment, wherein interprocessor interrupts are distributed by relying on cache coherency mechanisms, allowing for symmetric and scaleable distribution of interrupts without requiring a separate interrupt distribution mechanism, such as a separate interrupt bus.

The method discussed above may also be applied to multiprocessor systems that don't have main memory, i.e., cache only multiprocessor systems, or systems that do not include bus structures, such as multiprocessor systems wherein the processors are link connected.

Although the presently preferred embodiment of the invention has been described, it will be understood that various changes may be made within the scope of the appended claims.

What is claimed is:

1. In a processing system including a processor, a cache memory corresponding to said processor, a main memory, and a bus structure connecting said processor and said cache memory with said main memory, said processing system employing a cache coherency mechanism to maintain data consistency between said cache memory and said main memory, a method for distributing interrupts to said processor, said method comprising the steps of:

assigning to said processor an address within said main memory, said address being associated with an interrupt for said processor;

reading a copy of the contents of said address assigned to said processors into a cache memory address within said cache memory;

monitoring cache coherency operations to detect operations directed to said cache memory address; and generating an interrupt signal for said processor when a cache coherency operation directed to said cache memory address is detected.

2. The method in accordance with claim 1, wherein said step of monitoring cache coherency operations to detect operations directed to said cache memory address comprises the step of:

for each one of said cache coherency operations directed to said cache memory, comparing a target address associated with said one of said cache coherency operations with a stored interrupt base address.

3. The method in accordance with claim 1, wherein said cache coherency mechanism employed within said processing system comprises a Modified-Exclusive-Shared-Invalid (MESI) cache coherency protocol.

4. In a processing system including a processor, a cache memory corresponding to said processor, and a main memory, and a bus structure connecting said processor and said cache memory with said main memory, said processing system employing a cache coherency mechanism to maintain data consistency between said cache memory and said main memory, a method for generating a vector number for said processor, said method comprising the steps of:

assigning to said processor an address within said main memory, said address being associated with an interrupt for said processor;

reading a copy of the contents of said address assigned to said processors into a cache memory address within said cache memory;

monitoring cache coherency operations to detect operations directed to said cache memory address; and generating a vector number for said processor when a cache coherency operation directed to said cache memory address is detected.

5. In a processing system including a processor, a cache memory corresponding to said processor, and a main memory, and a bus structure connecting said processor and said cache memory with said main memory, said processing system employing a cache coherency mechanism to maintain data consistency between said cache memory and said main memory, a method for generating a plurality of vector numbers for said processor, said method comprising the steps of:

assigning to said processor multiple addresses within said main memory, each one of said multiple addresses being associated with one of said plurality of vector numbers for said processor, each one of said addresses including a first portion and a second portion, said first portion being the same for each one of said addresses, said second portion having a plurality of values, each value corresponding to a different one of said plurality of vector numbers for said processor;

reading a copy of the contents of said addresses assigned to said processor into said cache memory;

monitoring cache coherency operations to detect operations directed to said cache memory, each one of said cache coherency operations having a target address associated therewith, said target address including a first portion and a second portion;

for each one of said cache coherency operations directed to said cache memory, comparing the first portion of said target address with a stored interrupt base address; and decoding the second portion of said target address to generate a vector number corresponding to the value of said second portion if said first portion of said target address is equivalent to said stored interrupt base address.

6. In a processing system including a processor, a cache memory corresponding to said processor, and a main memory, and a bus structure connecting said processor and said cache memory with said main memory, and wherein:

multiple addresses within said main memory are assigned to said processor, each one of said multiple addresses being associated with one of a plurality of vector numbers for said processor, each one of said addresses including a first portion and a second portion, said first portion being the same for each one of said addresses, said second portion having a plurality of values, each value corresponding to a different one of said plurality of vector numbers for said processor; and a copy of the contents of said addresses assigned to said processor are read into said cache memory; and said processing system employs a cache coherency mechanism to maintain data consistency between said cache memory and said main memory;

apparatus for generating a plurality of vector numbers for said processor, said apparatus comprising:

a register for storing an interrupt base address;

a comparator connected to said bus structure to receive a first portion of an address associated with a cache coherency operation directed to said cache memory and connected to said register to receive said stored interrupt base address, said comparator generating an address match signal when said first portion of said address received from said bus structure is equivalent to said stored interrupt base address;

a decoder connected to receive a second portion of said address from said bus structure, said decoder having a plurality of output terminals and generating a single output signal at one of said plurality of output terminals in response to the receipt of said second portion of said address placed on said common bus;

a plurality of AND gates corresponding in number to said plurality of decoder output terminals, each AND gate being connected to its corresponding decoder output terminal and further connected to receive said address match signal, and a vector number generator connected to receive the outputs of said plurality of AND gates for providing one of a plurality of vectored numbers in response thereto.

7. The apparatus in accordance with claim 6 further comprising:

an OR gate connected to receive the outputs said plurality of AND gates and combining said outputs into a single interrupt signal.

* * * * *